United States Patent [19]

Bonneau

[11] Patent Number: 4,499,117

[45] Date of Patent: Feb. 12, 1985

[54] METHOD OF PREPARING NATURAL BEVERAGES HAVING A LOW ALCOHOL LEVEL, USING ULTRAFILTRATION TECHNIQUES

[76] Inventor: Marc Bonneau, 42, rue Bélissen, F-69005 Lyon, France

[21] Appl. No.: 420,251

[22] PCT Filed: Jan. 13, 1982

[86] PCT No.: PCT/FR82/00005

§ 371 Date: Sep. 13, 1982

§ 102(e) Date: Sep. 13, 1982

[87] PCT Pub. No.: WO82/02405

PCT Pub. Date: Jul. 22, 1982

[30] Foreign Application Priority Data

Jan. 13, 1981 [FR] France ................... 81 00915

[51] Int. Cl.$^3$ .................. C12G 3/08; C12G 1/00; B01D 13/00
[52] U.S. Cl. ......................... 426/592; 426/14; 426/15; 426/385; 426/493; 426/494; 426/804; 203/DIG. 13; 210/652
[58] Field of Search .................. 426/592, 590, 14, 15, 426/384, 385, 493, 494, 490, 804; 210/641, 650, 651, 652; 203/DIG. 13

[56] References Cited

U.S. PATENT DOCUMENTS 3,291,613 12/1966 Raible .................... 426/14
4,083,779 4/1978 Combe et al. ............ 426/15
4,265,920 5/1981 Thijssen ................. 426/494
4,322,448 3/1982 Matsuura et al. ......... 426/387
4,401,678 8/1983 Beaumont ............... 426/387

FOREIGN PATENT DOCUMENTS 717847 12/1968 Belgium.
2145298 3/1973 Fed. Rep. of Germany.
2323094 11/1974 Fed. Rep. of Germany.
2339206 3/1975 Fed. Rep. of Germany.
2413236 9/1975 Fed. Rep. of Germany.

Primary Examiner—Raymond Jones
Assistant Examiner—Elizabeth C. Weimar
Attorney, Agent, or Firm—Karl F. Ross; Herbert Dubno

[57] ABSTRACT

The method consists in subjecting a natural alcoholic liquid to three successive steps of non denaturating physical fractionation; the first step is a molecular utltrafiltration under low pressure through a semi-permeable ultra-filter the splitting threshold of which is between 30,000 and 1000 and preferably around 10,000; the second step is a reverse osmosis step applied to the ultra-filtrate resulting from the preceding operation through semi-permeable membranes the splitting threshold of which is between 500 and 100 and preferably around 250; the third step consists in evaporating and distillating under vacuum, at low temperature, the ultra-filtrate resulting from the second step. Natural beverages having a low alcohol content thus obtained. Products obtained from the filtrates or retention products of the various steps of the method.

5 Claims, No Drawings

METHOD OF PREPARING NATURAL BEVERAGES HAVING A LOW ALCOHOL LEVEL, USING ULTRAFILTRATION TECHNIQUES

The invention relates to a method of preparing natural beverages having a low alcohol content, and the beverages and other products obtained by carrying out the method.

The various alcoholic beverages currently found in a commerce, such as wines, beers, ciders, perrys, aperitives, liqueurs . . . are generally obtained by the alcoholic fermentation of different vegetable sugars contained in various fruits and berries (raisins, apples, pears, prunes, etc.).

The high alcohol content of these beverages, developed heretofore, constitutes at the present time a handicap if not a defect because the frequent ingestion and abuse of these beverages has grave and injurious consequences for human health and public hygiene.

The need to develop and commercialize nonalcoholic beverages thus appears to be an obligation to health and society. At the present time, various attempts to produce beverages with a low alcohol level have been reported in the literature. These efforts, in the case of wine and of beer, generally involve a modification of the alcohol fermentation process so as to reduce the latter in a qualitative and quantitative sense by the utilization of appropriate musts and yeasts.

On a laboratory level, tests of dealcoholization by chromatography have equally been carried out but the extrapolation of this technique to an industrial scale has been too onerous and inconsistent with wine-making rules.

It is also convenient to note that distillation constitutes a classical extraction process for alcohol in fermented beverages such as wine. This technique is energy-consuming and onerous and, when used in the production of alcohols of quality, invariably gives rise to by-products such as low grade wines and distillation residues whose physical, chemical and organoleptic qualities show modifications and denaturing with respect to the original beverages.

The production of beverages of a low alcohol level by passage through semi-permeable membranes has also been mentioned in various patents. Certain of these use a single reverse osmosis process to separate a beverage into a concentrate and a filtrate (Belgian Pat. No. 717 847, German Pat. No. 2 323 094, German Pat. No. 2 339 206) whose respective molecular compositions, and thus the physical, chemical and organoleptic properties, are strictly functions of the splitting (molecular weight separation) threshold of the membrane used. The concentrate, generally retained as a dealcoholized beverage, is of a reduced content or, depending upon the case, totally free of low molecular weight molecules, such as the salts, esters and the aldehydes rejected with the alcohol in the filtrate. Furthermore, the high pressures exerted during the reverse osmosis causes denaturation of a certain number of molecules and of intermolecular bonds which manifests itself as an alteration of the physical-chemical properties (increased turbidity, flocculation, etc.) and organoleptic properties (modified flavor and taste) of the final product. The same considerations apply to dealcoholization processes using other physical phenomena such as a single technique of ultrafiltration with a semipermeable membrane (German Pat. Nos. 2 145 298 and 2 413 236).

The nature of the retentate and of the filtrate obtained essentially depends upon the molecular weight separation threshold of the membrane used and in a given time the dealcoholization generally results in a retentate of large molecules free from the esters, aldehydes and salts necessary for a good taste of the final beverage.

The dialysis process which utilizes still another physical phenomenon (Belgian Pat. No. 883 829) results in the entrainment of the alcohol through a dialysis membrane by a counterelution solution giving the same drawbacks as the preceding with resepct to the final dealcoholized product.

The principal object of the invention is to provide for the preparation and fabrication, starting from a natural liquid already alcoholic and whose fermentation cycle has been completed, of a beverage reconstituted but of low alcohol level (less than 5° Gay Lussac) which retains organoleptic, physical-chemical and biological properties very near those of the original liquid.

For this object there is provided a process for preparing a natural beverage of low alcohol level whose novelty consists in subjecting a natural alcoholic liquid to a plurality of physical nondenaturing fractionating steps comprising in succession, molecular filtration on semipermeable membranes (ultrafiltration and reverse osmosis) associated with a vacuum distillation at low temperature. The various fractions obtained at each stage of the treatment are then recombined so as to produce a final liquid devoid of all or part of the original alcohol.

These physical fractionation steps by molecular filtration are advantageously selected from a succession of molecular ultrafiltration of the alcoholic liquid at low pressure through a semipermeable ultrafilter whose molecular weight separation threshold is between 30,000 and 1,000 and preferably about 10,000, and reverse osmosis of the ultrafiltrate under pressure through a synthetic semi-permeable whose molecular weight separation threshold is between 500 and 100 and preferably about 250. The osmosate is then subjected to vacuum distillation at low temperature to eliminate alcohol and produce an aqueous retentate which is piquant (salty) and aromatic.

It is thus possible, thanks to these successive steps of nondenaturing physical fractionation, to separate the elements constituting an alcoholic liquid according to their size and their molecular weights and their boiling-evaporation point and thus to extract, to separate and to eliminate an important part of the low molecular weight alcohols (methanol, ethanol) contained in a fractionated liquid, all while conserving the other elements of high molecular weight and thereby preserving the organoleptic biological and physical-chemical properties of the beverage. The different retentates obtained after ultrafiltration, reverse osmosis and evaporation are mixed in suitable proportions to provide a final reconstituted beverage of a low alcohol content.

The novelty of the embodiment of the invention resides in the choice and the chronological arrangement of the successive techniques, already known per se, according to a judicious program which permits the elimination of the alcohol while maintaining the qualitative and quantitative integrity of the mixture of diverse molecules contained in the starting beverage.

According to another embodiment, the products resulting from successive molecular filtrations can be subjected to a drying step under vacuum by sublimation after freezing of the retentate obtained.

The starting natural alcoholic liquids are advantageously selected from the wines, the beers, the perrys, the ciders, the aperitives, the liqueurs and liquids resulting from the alcoholic fermentation of vegetable glucides.

The invention also has as its object the diverse products resulting from carrying out the process according to the invention and particularly the dealcoholized beverage thus obtained which has physical-chemical, biological and organoleptic properties all of which are comparable to those of the alcoholic liquid, the other products resulting from the different steps of the process according to the invention and especially the alcohols forming the filtrates and the vapors; the invention concerns also the mixtures of these same products, especially the end-products of the fabrication of various dealcoholized beverages.

The ultrafiltration on semi-permeable membranes is an industrial technique which permits the separation, under a given pressure, comprised between $10^5$ Pa and $8 \times 10^5$ Pa of two or more different molecular species as a function of their molecular weights at ambient temperature, for example between 10° and 30° C. without change of phase. The ultrafiltration consists in forcing certain elements of small molecular size to pass, by application of the given overpressure, through a synthetic, semi-permeable membrane or ultrafilter possessing a microstructure and a porosity sufficiently fine to permit passage of the small molecules (filtrate) and to retain the large molecules (retentate).

The ultrafilters are characterized by their molecular weight separation threshold which corresponds to the molecular mass at which molecular species are totally retained.

Osmosis is a physical phenomenon which is manifested by the passage of a solvent (water, alcohol . . . ) through a natural or synthetic semi-permeable membrane which retains the flux of a solute (dissolved mineral salts, organic molecules, etc. . . . ). Direct osmosis is manifested by a passage of water through a semi-permeable membrane from a saline solution of low concentration toward a saline solution of greater concentration up to an osmotic equilibrium phase. Reverse osmosis, as its name indicates, develops by application of a pressure greater than the osmotic pressure upon a concentrated saline solution. A flow of solvent (water, alcohol) is established through a semi-permeable membrane from a concentrate solution toward the dilute solution such that the membrane retains the mineral ions, organic molecules, etc . . . . Reverse osmosis has been for several years an industrial technique thanks to the existence of various osmosers prepared from hollow fibers or aromatic polyamide.

Vacuum distillation at low temperature is utilized largely in industrial distilleries. It is less denaturing than distillation under normal atmospheric pressure and consumes less energy. In the case of the process according to the invention, it is applied to a liquid mixture of very small molecules (water, salts, esters, alcohols, etc . . . ) and requires less specific energy than the treatment of a complex mixture of large, medium and small molecules. Under these conditions it is effective for the selective evaporation of the alcohol and has little denaturing effect on the other small molecules of the solution.

The carrying out of the steps of the physical fractionation process according to the invention and the advantages of the invention will be more readily apparent and the advantages of the invention better appreciated from the following examples which illustrate the invention without limiting it.

EXAMPLE 1

(1-1) 1000 liters of red wine (Bordeaux, Côtes de Castillon) with a 12° Gay Lussac alcohol titer are subjected, a first time, to a plurality of passes through a battery of molecular ultrafiltration modules on semi-permeable synthetic membranes whose porosities decrease as are commonly marketed under the name MILLIPORE MU 15 with a molecular weight separation threshold of about 10,000. These membranes are inert at all pH values and are not attacked by organic acids.

After passage through this battery of ultrafiltration modules, there are recovered:

on the one hand 950 liters of a filtrate $F_1$ at 12° Gay Lussac containing all of the elements whose molecular weight is less than 10,000 daltons, such as the sugars, peptides, esters, alcohols, vitamins, water, mineral salts . . .

on the other hand 50 liters of a retentate $R_1$ of 12°GL combining the elements whose molecular weight is greater than 10,000 such as the flavones, anthocyanic pigments and the leucoanthocyans and the organic acid salts such as the tartrates.

(1-2) Then the 950 liters of the filtrate $F_1$ are passed through an osmoser of aromatic polyamide hollow fibers of the type marketed by the firm Dégremont and whose molecular weight separation threshold is about 250; this material is inert vis-à-vis most of the chemical products including acid pH's of the order of 4. The fibers are disposed in a module which receives the filtrate $F_1$ (complex organic fraction resulting from but different from the starting wine and with a molecular weight less than or equal to 10,000) under a pressure of the order of $8 \times 10^5$ to $12 \times 10^5$ Pa, through the intermediary of a porous distributor of the flow located along the axis of the module. The filtrate $F_1$ is guided radially in the module around the hollow fibers. Under the effect of the pressure applied, water and molecules of a molecular weight less than 250 (methanol, ethanol, acetic acid, mineral salts) traverse the membrane of the hollow fibers and flow from the interior of the fibrous channels and are discharged at the periphery of the module in the form of 850 liters of a filtrate $F_2$ having a titer of 12° GL (complex organic fraction resulting from but different from the filtrate $F_1$, with a molecular weight less than or equal to 250).

On the other hand, 100 liters are recovered of a retentate $R_2$ at 12° GL enriched in salts, sugars, polyalcohols, aldehydes, vitamins, freed or absorbed on macromolecules, of a molecular weight between 10,000 and 250 and also containing the quantity of small molecules of a molecular weight less than 250 proportional to these 100 liters.

(1-3) The 850 liters of $F_2$ (or osmosate) are then subjected to evaporation on a vacuum distillation column (0.015 atm.) at low temperature (45° C.) for several hours. The ethylic alcohol thus evaporated in major part is cooled and collected.

The liquid retentate $R_3$ remains in the column after evaporation and is principally constituted of a mixture of water, simple acids, ions and aldehydes.

The retentate $R_3$ is utilized as a diluent for mixture with the retentates $R_1$ and $R_2$ in suitable proportions.

The mixture of retentates $R_1$ and $R_2$ enriched particularly in the macromolecules responsible for the organoleptic qualities such as the flavones, the anthocyans, catechins, lencoanthocyans and the polyalcohols, on which are absorbed or complexed the organic acid salts such as potassium tartrate or calcium tartrate and the aromatic aldehydes, also the vitamins and other macromolecular substances responsible for the biological qualities, permits, after addition of 850 liters of $R_3$, 1000 liters of a natural beverage to be formed which is in all respects comparable from the point of view of taste to the original red wine and whose alcohol content is of the order of 5° GL.

This beverage has a diminished volatile acidity and total acidity with respect to the original beverage and a slight modification of dry weight and a practically constant pH as will be apparent from Table 1.

TABLE 1

| PHYSIOCHEMICAL CHARACTERISTICS | ORIGINAL WINE (Bordeaux, Côtes de Castillon) | DEALCO- HOLIZED WINE |
|---|---|---|
| Alcohol level °Gay LUSSAC | 12° | ≅5° C. |
| Reduced sugar Gr/l | <2 gr | <2 gr |
| Total acidity Gr/l | 3.75 | 2.95 |
| Volatile acidity Gr/l | 0.64 | 0.48 |
| SO₂ Free mg | 17 | 8 |
| SO₂ Total mg | 118 | 55 |
| Extract (Dry) (Gr) | 26.7 | 22.8 |
| pH | 3.55 | 3.48 |

EXAMPLE 2

1000 liters of semi-dry white wine (Côtes Montravel) titering 13° GL are treated according to the process of the present invention following the sequence described in example 1.

One obtains finally 1000 liters of a white wine titering 5°4 whose organoleptic and biological qualities are in all respects comparable to those of the original wine.

Table 2 assembles the physical-chemical characteristics of the starting wine and the dealcoholized wine obtained by carrying out the process according to the invention.

TABLE 2

| PHYSIOCHEMICAL CHARACTERISTICS | ORIGINAL WINE (Côtes Montravel) | DEALCO- HOLIZED WINE |
|---|---|---|
| Alcohol level °Gay LUSSAC | 13° | 5° 4 |
| Reduced sugar Gr/l | <2 gr | <2 gr |
| Total acidity Gr/l | 4 | 3.2 |
| Volatile acidity Gr/l | 0.61 | 0.47 |
| SO₂ Free mg | 17 | 10 |
| SO₂ Total mg | 166 | 89 |
| Extract (Dry) (Gr) | 22.3 | 18.4 |
| pH | 3.45 | 3.42 |

EXAMPLE 3

Example 1 is repeated and the retentates $R_1$ and $R_2$ are combined from the ultrafiltration and reverse osmosis steps of Example 1 with the retentate $R_3$ formed by the vacuum distillation step and the combination is subjected to a lyophilization step by evaporation and sublimation under vacuum after freezing at $-20°$ C. After several days a dry and powdery residue is obtained by this cryodesiccation which contains in concentrated form all of the constituents of the wine with the exception of the alcohol and possessing, after suitable rehydration, the physical-chemical, biological and organoleptic qualities in all respects comparable to the starting wine.

As can be seen from the foregoing, the present invention is not limited to the embodiments described above by way of example; on the contrary it also embraces all of the variants such as those in particular which relate to the nature of the ultrafiltration or reverse osmosis membranes (polyamide, polysulfones . . . ), the physcial form of the ultrafiltration modules (planar, tubular, hollow fibers . . . ) and of the vacuum distillation apparatuses.

I claim:

1. A process for the preparation of a natural beverage having a low alcohol level, which comprises the steps of:
   (a) ultrafiltering a natural alcoholic liquid under low pressure through a semi-permeable ultrafilter whose molecular weight separation threshold is about 10,000 to form as a retentate $R_1$, containing a mixture of organic molecules of a molecular weight greater than or equal to 10,000, and an ultrafiltrate $F_1$, containing a mixture of organic molecules of a molecular weight less than 10,000;
   (b) subjecting the ultrafiltrate $F_1$ formed during step (a), to reverse osmosis under high pressure through a semi-permeable membrane whose molecular weight separation threshold is about 250 to form as a retentate $R_2$, containing a mixture of organic molecules of a molecular weight between 10,000 and 250 and an ultrafiltrate $F_2$, containing a mixture of organic molecules of a molecular weight less than 250;
   (c) evaporating by vacuum distillation under a low temperature the ultrafiltrate $F_2$ prepared during step (b) to yield a retentate $R_3$, which contains a mixture of molecules of molecular weight less than 250, and an evaporate $F_3$, which is alcohol; and
   (d) forming the natural beverage of low alcohol content by mixing in suitable proportions corresponding to the levels of the starting product in the elements supporting the organoleptic, biological and physical-chemical properties, the retentates $R_1$, $R_2$ and $R_3$, or the retentates $R_1$ and $R_3$ or the retentates $R_2$ and $R_3$.

2. The process defined in claim 1 wherein the natural alcoholic liquid is selected from the group consisting of wines, beers, perrys, ciders, aperitives, liqueurs, and liquids resulting from vegetable glucide fermentation.

3. The process defined in claim 1, further comprising the step of:
   recovering the alcohol evaporate $F_3$ resulting from step (c).

4. The process defined in claim 1, further comprising the step of:
   lyophilizing the mixture of the retentates formed during step (d) to form a dry beverage mix.

5. The dry beverage mix having a low alcohol content formed by the process defined in claim 4.

* * * * *